United States Patent
Lee

(10) Patent No.: US 11,634,124 B2
(45) Date of Patent: Apr. 25, 2023

(54) METHOD OF RECOGNIZING MEDIAN STRIP AND PREDICTING RISK OF COLLISION THROUGH ANALYSIS OF IMAGE

(71) Applicant: CARVI INC., Seoul (KR)

(72) Inventor: Eunsu Lee, Seoul (KR)

(73) Assignee: CARVI INC., Seoul (KR)

( * ) Notice: Subject to any disclaimer, the term of this patent is extended or adjusted under 35 U.S.C. 154(b) by 364 days.

(21) Appl. No.: 17/029,071

(22) Filed: Sep. 23, 2020

(65) Prior Publication Data

US 2022/0063608 A1 Mar. 3, 2022

(30) Foreign Application Priority Data

Aug. 26, 2020 (KR) .................. 10-2020-0107791

(51) Int. Cl.
*B60W 30/095* (2012.01)
*B60W 30/12* (2020.01)
(Continued)

(52) U.S. Cl.
CPC .......... *B60W 30/095* (2013.01); *B60W 30/12* (2013.01); *B60W 50/16* (2013.01);
(Continued)

(58) Field of Classification Search
CPC .... B60W 30/095; B60W 30/12; B60W 50/16; B60W 2050/143; B60W 2050/146;
(Continued)

(56) References Cited

U.S. PATENT DOCUMENTS

2002/0047895 A1* 4/2002 Bernardo ........... G01C 21/3848
382/284
2010/0228437 A1* 9/2010 Hanzawa ................ B62D 1/28
382/199
(Continued)

FOREIGN PATENT DOCUMENTS

| CN | 107729856 | * | 2/2018 |
| KR | 10-1342124 B1 | | 12/2013 |
| KR | 10-1455835 B1 | | 11/2014 |

OTHER PUBLICATIONS

Timo Scharwachter, Visual Guard Rail Detection for Advanced Highway Assistance Systems, Jun. 11, 2014, 2014 IEEE Intelligent Vehicles Symposium (Year: 2014).*

(Continued)

*Primary Examiner* — Elaine Gort
*Assistant Examiner* — Matthias S Weisfeld
(74) *Attorney, Agent, or Firm* — Park, Kim & Suh, LLC

(57) ABSTRACT

A method of recognizing a median strip and predicting risk of a collision through analysis of an image includes acquiring an image of the road ahead including a median strip and a road bottom surface through a camera of a moving vehicle (S110), generating a Hough space by detecting an edge from the image (S120), recognizing an upper straight line of the median strip from the Hough space (S130), generating a region of interest (ROI) of the median strip using information on the upper straight line of the median strip and a lane (S140), detecting an object from an internal part of the ROI of the median strip through a labeling scheme (S150), and determining a tracking-point set of the objects that satisfy a specific condition (S160).

16 Claims, 13 Drawing Sheets

(51) Int. Cl.
  *B60W 50/16* (2020.01)
  *G06T 7/13* (2017.01)
  *G06V 10/48* (2022.01)
  *G06T 5/00* (2006.01)
  *G06V 10/20* (2022.01)
  *G06V 20/56* (2022.01)
  *B60W 50/14* (2020.01)

(52) U.S. Cl.
  CPC ............ *G06T 5/002* (2013.01); *G06T 7/13* (2017.01); *G06V 10/255* (2022.01); *G06V 10/48* (2022.01); *G06V 20/588* (2022.01); B60W 2050/143 (2013.01); B60W 2050/146 (2013.01); G06T 2207/30256 (2013.01)

(58) Field of Classification Search
  CPC . G06T 7/13; G06T 5/002; G06T 2207/30256; G06V 10/48; G06V 10/255; G06V 20/588
  USPC ............................................ 701/301
  See application file for complete search history.

(56) References Cited

U.S. PATENT DOCUMENTS

2012/0069185 A1* 3/2012 Stein .................. G06V 20/58
  348/148
2012/0162415 A1* 6/2012 Wu .................... H04N 7/18
  348/142

OTHER PUBLICATIONS

Christos Nikolaos E. Anagnostopoulos, A License Plate-Recognition Algorithm for Intelligent Transportation System Applications, Sep. 2006, IEEE Transactions on Intelligent Transportation Systems, vol. 7, No. 3 (Year: 2006).*

Xueyang Fu, Removing rain from single images via a deep detail network, 2017 (Year: 2017).*

Robert Collins, Lecture 12: Camera Projection, Sep. 22, 2015 (Year: 2015).*

* cited by examiner

FIG. 1B (S170) → FIRST PURSUIT-POINT SET AND SECOND PURSUIT-POINT SET BOTH PRESENT? (S181)

YES → DETERMINE LOWER STRAIGHT LINE OF MEDIAN STRIP USING INTERMEDIATE VALUE OF WORLD COORDINATES (S182)

NO → ONLY FIRST PURSUIT-POINT SET PRESENT? (S183)

YES → CORRECT OR MAINTAIN LOWER STRAIGHT LINE OF MEDIAN STRIP (S184)

NO → ONLY SECOND PURSUIT-POINT SET PRESENT? (S185)

YES → CORRECT OR MAINTAIN LOWER STRAIGHT LINE OF MEDIAN STRIP (S186)

→ (S190)

METHOD OF RECOGNIZING MEDIAN STRIP AND PREDICTING RISK OF COLLISION THROUGH ANALYSIS OF IMAGE

CROSS-REFERENCE TO RELATED APPLICATIONS

This application claims priority from Korean Patent Application No. 10-2020-0107791, filed on Aug. 26, 2020, in the Korean Intellectual Property Office, the disclosure of which is incorporated herein by reference in its entirety.

BACKGROUND OF THE INVENTION

Field of the Invention

The present disclosure relate to a method of recognizing a median strip and predicting the risk of a collision through analysis of an image for recognizing a concrete median strip from an image acquired from a forward camera of a moving vehicle and predicting the possibility of a collision with a median strip.

Description of the Related Art

Recently, researches has been conducted into a method of recognizing a foregoing vehicle, a lane, and a median strip using an image of the road ahead as autonomous driving technology for preventing a collision.

In particular, the most import part of research related to recognition of a median strip is recognition of a lower straight line of the median strip, that is, a lower straight line of a bounding portion between the median strip and a road surface.

For example, the position at which a moving vehicle is predicted to collide with a median strip is an intersection point between the lower straight line and a predicted travel path of the moving vehicle, and thus the lower straight line needs to be determined or estimated with high accuracy.

To this end, in the case of a guard-rail median strip, a method of calculating a moving speed at an intersection point by detecting both a vertical edge element of the guard-rail median strip and a lower straight line of the median strip was proposed, and in the case of a concrete median strip, a method of calculating a motion vector of a patch around straight lines parallel to a road was proposed.

As such, the methods was performed assuming that the lower straight line of the median strip is detected from an image, but in particular, in the case of a concrete median strip, it is impossible to detect an edge for identifying a road bottom surface due to the similarity of colors between the median strip and the road bottom surface, and thus the lower straight line of the median strip is often not identified.

Accordingly, there is a problem in that it is almost impossible to recognize a concrete median strip and it is not possible to accurately predict the possibility of a collision between a vehicle and the median strip.

SUMMARY OF THE INVENTION

The present disclosure provides a method of recognizing a median strip and predicting the risk of a collision through analysis of an image for recognizing a concrete median strip from an image acquired from a forward camera of a moving vehicle and predicting the possibility of collision with the median strip.

According to an aspect of the present disclosure, a method of recognizing a median strip and predicting risk of a collision through analysis of an image includes acquiring an image of the road ahead including a median strip and a road bottom surface through a camera of a moving vehicle, generating a Hough space by detecting an edge from the image, recognizing an upper straight line of the median strip from the Hough space, generating a region of interest (ROI) of the median strip using information on the upper straight line of the median strip and a lane, detecting an object from an internal part of the ROI of the median strip through a labeling scheme, determining a tracking-point set of the objects that satisfy a specific condition, determining whether a lower straight line of the median strip from the Hough space is present between a first tracking point on a side surface of the median strip having a predetermined height from the tracking-point set and a second tracking point on a bottom surface, determining or estimating the lower straight line of the median strip according to whether the lower straight line of the median strip is detected, and predicting a predicted collision position and a predicted collision time by detecting an intersection point between the determined or estimated lower straight line of the median strip and a traveling-path straight line of the vehicle.

The edge image is generated, and the Hough space is generated to detect a straight line in the edge image.

Among a plurality of straight lines in the Hough space, a straight line positioned at an uppermost end, other than the lane, may be recognized as the upper straight line of the median strip.

A region of interest (ROI) of the median strip may be generated using information on coordinates of an image of the upper straight line of the median strip and a left lane.

The object may be detected by performing the labeling scheme to separate objects having 8-connectivity from an edge present in the ROI of the median strip.

The determining the tracking-point set may include storing object coordinates in a time series of the objects in a memory having a first-in-first-out (FIFO) structure with respect to N frames and maintaining the object coordinates in a set of objects, and determining a set of objects that satisfy a first condition, in which a difference between lateral distances in a world coordinate system at the positions of the objects being tracked, which correspond to a $k^{th}$ frame and a $(k-1)^{th}$ frame, is a minimum value and a second condition in which, when a height of the object in the world coordinate system is 0, a speed of the moving vehicle and a speed of the object are the same, and when the height of the object is greater than 0, the speed of the object is greater than the speed of the moving vehicle, as the tracking-point set.

A history set H of an object may be defined using Equations 1 and 2 with respect to the N frames,

[Equation 1]

$$S(f) = \{(x_i, y_i), (X_i, Y_i, 0) \mid i = 1, \ldots, n\}$$

$$H = \{S(f) \mid f = k, \ldots, k-N\} \qquad \text{[Equation 2]}$$

where s(f) is a set of object coordinates in image frame #f, $(x_i, y_i)$ is image coordinates of an object, $(X_i, Y_i)$ is world coordinates when a height of the object is assumed to be 0, and the history set H is a set of coordinates of objects in a $k^{th}$ frame from a $(k-N)^{th}$ frame, the first condition may be defined using Equation 3 below:

[Equation 3]

$$D_X = \sqrt{(X_{i(f)} - X_{i(f-1)})^2}$$

where $D_x$ is a distance between a world coordinate X of an $i^{th}$ object in an $f^{th}$ frame and a world coordinate X of an $i^{th}$ object in a $(f-1)^{th}$ frame, and the second condition may be defined using Equation 4 below:

$$V_{SV} = V_{obj} \text{ if } Z=0$$

$$V_{SV} < V_{obj} \text{ if } Z>0 \qquad \text{[Equation 4]}$$

where Z is a height of the object in the world coordinate system, $V_{SV}$ is the speed of the moving vehicle, and $V_{obj}$ is the speed of the object.

The speed of the object is calculated using Equations 5 and 6 below:

[Equation 5]

$$D = \sqrt{(X_{i(f)} - X_{i(f-1)})^2 + (Y_{i(f)} - Y_{i(f-1)})^2}$$

[Equation 6]

$$V_{obj} = \frac{D\,(\text{mm})}{1(\text{frame})} = D\,(\text{mm/frame})$$

where D is a Euclidean distance between world coordinates of an $i^{th}$ frame and world coordinates of an $(f-1)^{th}$ frame, and $V_{obj}$ is a moving distance per frame, and when a standard deviation σ defined using Equation 7 below is smaller than a specific threshold, the tracking-point set may be determined as the tracking-point set T defined using Equation 8 below:

[Equation 7]

$$V_\delta = V_{obj} - V_{SV}$$

$$\sigma = \sqrt{\frac{\sum_{f=1}^n (V_\delta^f - \mu)^2}{n}}$$

$$\mu = \frac{\sum_{f=1}^n V_\delta^f}{n}$$

$$T = \{t(i)|i=1,\ldots,n\}$$

$$t(i) = \{(x_f, y_f), (X_f, Y_f, 0)|f=k,\ldots,k-m\} \qquad \text{[Equation 8]}$$

where $V_\delta$ is a difference between $V_{obj}$ and $V_{SV}$, σ is a standard deviation of $V_\delta$ in a set of n frames, μ is an average of $V_\delta$, t(i) is an $i^{th}$ tracking-point set including image coordinates $(x_f, y_f)$ and world coordinates $(X_f, Y_f, 0)$, and T is an entire tracking-point set.

Tracking points of the tracking-point set may be obtained by converting image coordinates of the object into world coordinates using Equation 9 below:

[Equation 9]

$$w_h = [PCRG]^{-1} c_h$$

$$c_i = \begin{bmatrix} \dfrac{\lambda x_c}{\lambda - z_c} \\ \dfrac{\lambda y_c}{\lambda - z_c} \end{bmatrix}$$

where $W_h = [X,Y,Z,1]^T$ is a world coordinate system, $c_i = [x_i, y_i,]^T$ is an image coordinate system, $c_h = [x_c, y_c, z_c]^T$ is a coordinate system of a camera, P is a perspective transformation matrix, C is displacement of an image plane origin, R is rotational transform, and G is a displacement transformation matrix of the camera, and when an average speed of the tracking points of the tracking-point set is greater than an average speed of the moving vehicle with respect to m frames, determined using Equation 10 below, a tracking-point set having a predetermined height may be recognized as an object on a side surface of the median strip:

$$\overline{V}_{SV} < \overline{V}_{obj}. \qquad \text{[Equation 10]}$$

Through the above procedures, the tracking-point set may be determined as the first tracking-point set on the side surface having a predetermined height and the second tracking-point set on the bottom surface.

When a straight line is present on the Hough space between the first tracking point and the second tracking point, the straight line may be determined as the lower straight line of the median strip, and when a straight line is not present, the lower straight line of the median strip may be estimated.

The lower straight line of the median strip may be estimated from world coordinates of the first tracking point of the object on the side surface of the median strip or the second tracking point on the bottom surface.

Whether the first tracking-point set and the second tracking-point set are both present may be determined, and when the first tracking-point set and the second tracking-point set are both present, an equation of the lower straight line of the median strip may be calculated using Equation 11 below:

[Equation 11]

$$X_{dw} = \frac{X_1 + X_2}{2}$$

where $X_{dw}$ is a lateral coordinate of the lower straight line of the median strip, $X_1$ is a lateral coordinate of the first tracking point, and $X_2$ is a lateral coordinate of the second tracking point, when only the first tracking-point set is present, the lower straight line of the median strip may be estimated by correcting coordinates of the lower straight line of the median strip using Equations 12 to 14 below:

$$X_\delta = X_L - X_1 \text{ if } X_1 > X_{dw}^{f-1} \qquad \text{[Equation 12]}$$

where $X_\delta$ is a lateral difference of the lower straight line of the median strip with respect to a lane, $X_L$ is a lateral world coordinate of a left lane, and $X^{f-1}_{dw}$ is a lateral coordinate of the lower straight line of the median strip in a previous frame:

[Equation 13]

$$\hat{x}_k = \frac{n-1}{n} \hat{x}_{k-1} + \frac{1}{n} X_\delta$$

where Equation 13 above is a moving average filter for calculating average data of $X_\delta$, $\hat{x}_k$ is average data of $X_\delta$ passing through the moving average filter, $\hat{x}_{k-1}$ is average data of $X_\delta$ obtained in a previous stage, and $X_\delta$ calculated using Equation 12 above is corrected by applying Equation 13 above:

$$X_{dw}^f = X_L - \hat{x}_k \quad \text{[Equation 14]}$$

where $X_{dw}^f$ is a lateral coordinate of the lower straight line of the median strip in a current frame, when $X_{dw}^{f-1}$ is not smaller than $X_1$, coordinates of the lower straight line of the median strip are maintained, and the lower straight line of the median strip may be estimated, and when only the second tracking-point set is present, the lower straight line of the median strip may be estimated by correcting coordinates of the lower straight line of the median strip using Equations 13 and 14 and Equation 15 below:

$$X_\delta = X_L - X_2 \text{ if } X_2 < X_{dw}^{f-1} \quad \text{[Equation 15]}$$

where a lateral coordinate of the lower straight line of the median strip in the current frame is corrected by applying $X_\delta$, calculated using Equations 15, to Equations 13 and 14, and when $X_{dw}^{f-1}$ is not smaller than $X_2$, coordinates of the lower straight line of the median strip are maintained and the lower straight line of the median strip is estimated.

The predicted collision position may be determined as an intersection point between the lower straight line of the median strip and a predicted path straight line of the moving vehicle, and the predicted collision time is defined using Equation 16 below:

$$TTC = d_i / V_{SV} \quad \text{[Equation 16]}$$

where TTC is the predicted collision time, $d_i$ is a predicted collision distance, and $V_{SV}$ is speed of the moving vehicle.

The predicted path straight line may be a straight line passing through short-distance world coordinates having a coordinate X corresponding to ½ of an area of the moving vehicle and a coordinate Y corresponding to a forward distance of 0 m and a long-distance world coordinate of a coordinate X corresponding to ½ of an area of the moving vehicle and a coordinate Y corresponding to a forward distance of 1000 m.

The method may further include providing a warning information about the median strip at the predicted collision position and the predicted collision time.

The warning information about the median strip may be provided in a form of an image and sound from a navigation device, vibration of a steering device, or sound of a speaker of a vehicle, or the vehicle may be maintained in a lane by autonomously adjusting the steering device in conjunction with a lane-keeping assistance system based on the warning information about the median strip.

An edge may be detected by removing a repetitive noise pattern from the image of the road ahead during rain, snow, or fog.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIGS. 1A and 1B are schematic flowcharts showing a method of recognizing a median strip and predicting the risk of a collision through analysis of an image according to an embodiment of the present disclosure;

DETAILED DESCRIPTION OF THE EXEMPLARY EMBODIMENTS

Exemplary embodiments of the present disclosure are described in detail so as for those of ordinary skill in the art to easily implement the present disclosure with reference to the accompanying drawings. However, the present disclosure may be implemented in various different forms and is not limited to these embodiments.

According to an embodiment of the present disclosure, a method of recognizing a median strip and predicting the risk of a collision through analysis of an image may include acquiring an image of the road ahead including a median strip and a road bottom surface through a camera of a moving vehicle (S110), generating a Hough space by detecting an edge from the image (S120), recognizing an upper straight line of the median strip from the Hough space (S130), generating a region of interest (ROI) of the median strip using information on the upper straight line of the median strip and a lane (S140), detecting an object from an internal part of the ROI of the median strip through a labeling scheme (S150), determining a tracking-point set of the objects that satisfy a specific condition (S160), determining whether a lower straight line of the median strip from the Hough space is present between a first tracking point on a side surface of the median strip having a predetermined height from the tracking-point set and a second tracking point on a bottom surface (S170), determining or estimating the lower straight line of the median strip according to whether the lower straight line of the median strip is detected (S180A and 180B), and predicting a predicted collision position and a predicted collision time by detecting an intersection point between the determined or estimated lower straight line of the median strip and a traveling-path straight line of the vehicle (S190), and thus may prevent a collision accident by recognizing the lower straight line of a concrete median strip and predicting the possibility of a collision between a vehicle and the median strip.

Hereinafter, with reference to FIGS. 1A to 8B, a method of recognizing a median strip and predicting the risk of a collision through analysis of an image including the aforementioned operations will be described below in detail.

First, in the acquiring the image of the road ahead (S110), the image of the road ahead including the median strip and the road bottom surface may be acquired through a forward camera of the moving vehicle.

Figure 1A:
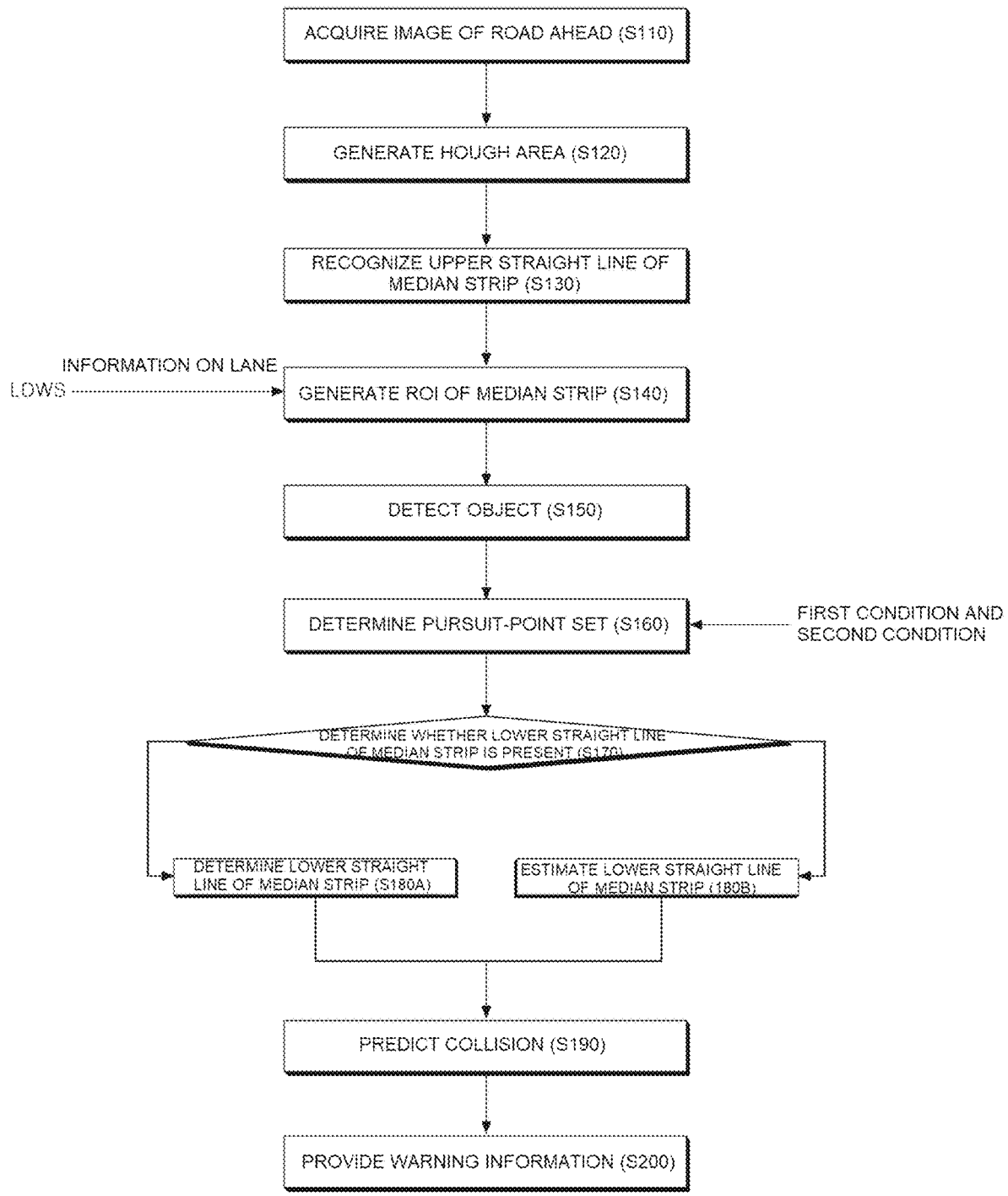
Figure 2A:
FIG. 2A is a diagram showing an example of an operation of acquiring an image of the road ahead of FIG. 1A.

Here, referring to FIG. 2A, in the image acquired through the forward camera, a lower bounding line of the median strip, that is, the lower straight line of the median strip, is not easily identified due to the similarity of colors between a lower part of a side surface of a concrete median strip and a bottom surface of the outside of a first lane, and accordingly, hereinafter, a method of determining or estimating a lower straight line of the median strip using movement of objects of an area around the median strip will be proposed.

The edge may also be more easily detected in subsequent operations by removing a repetitive noise pattern from the image of the road ahead during rain, snow, or fog in order to minimize variation due to weather.

Subsequently, in the generating the Hough space (S120), the Hough space may be generated by detecting the edge from the image.

Figure 2B:
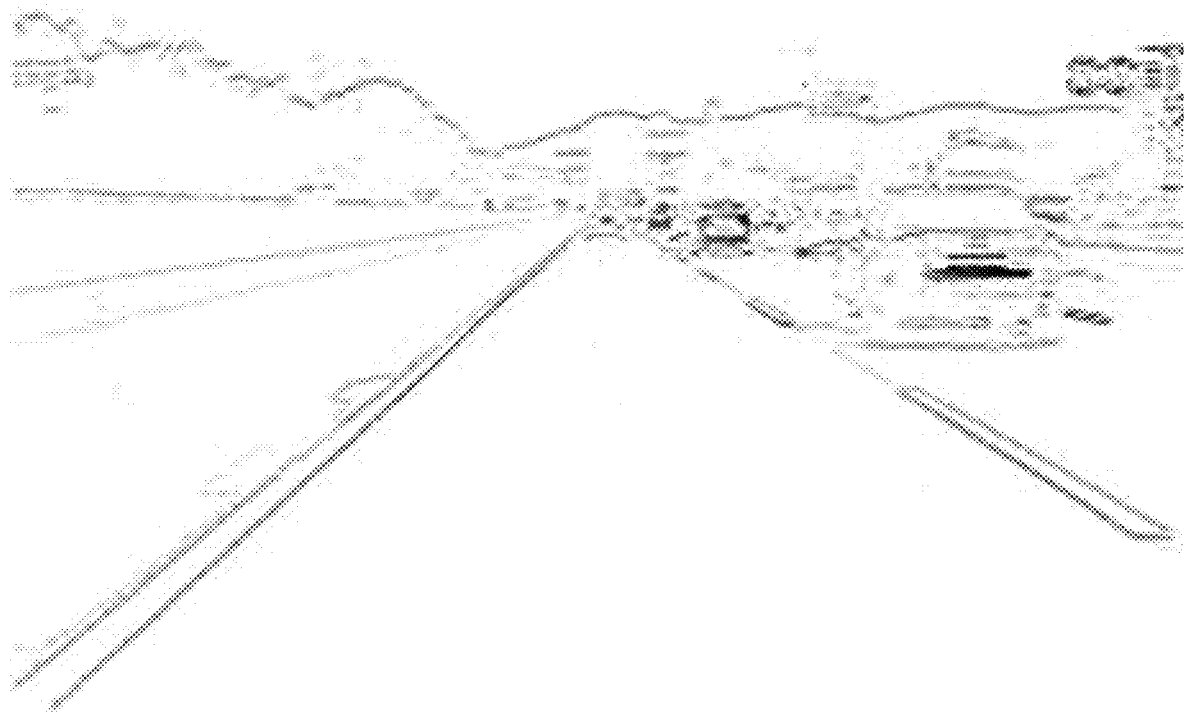
FIG. 2B is a diagram showing an example of an operation of detecting an edge of FIG. 2A.
Figure 3:
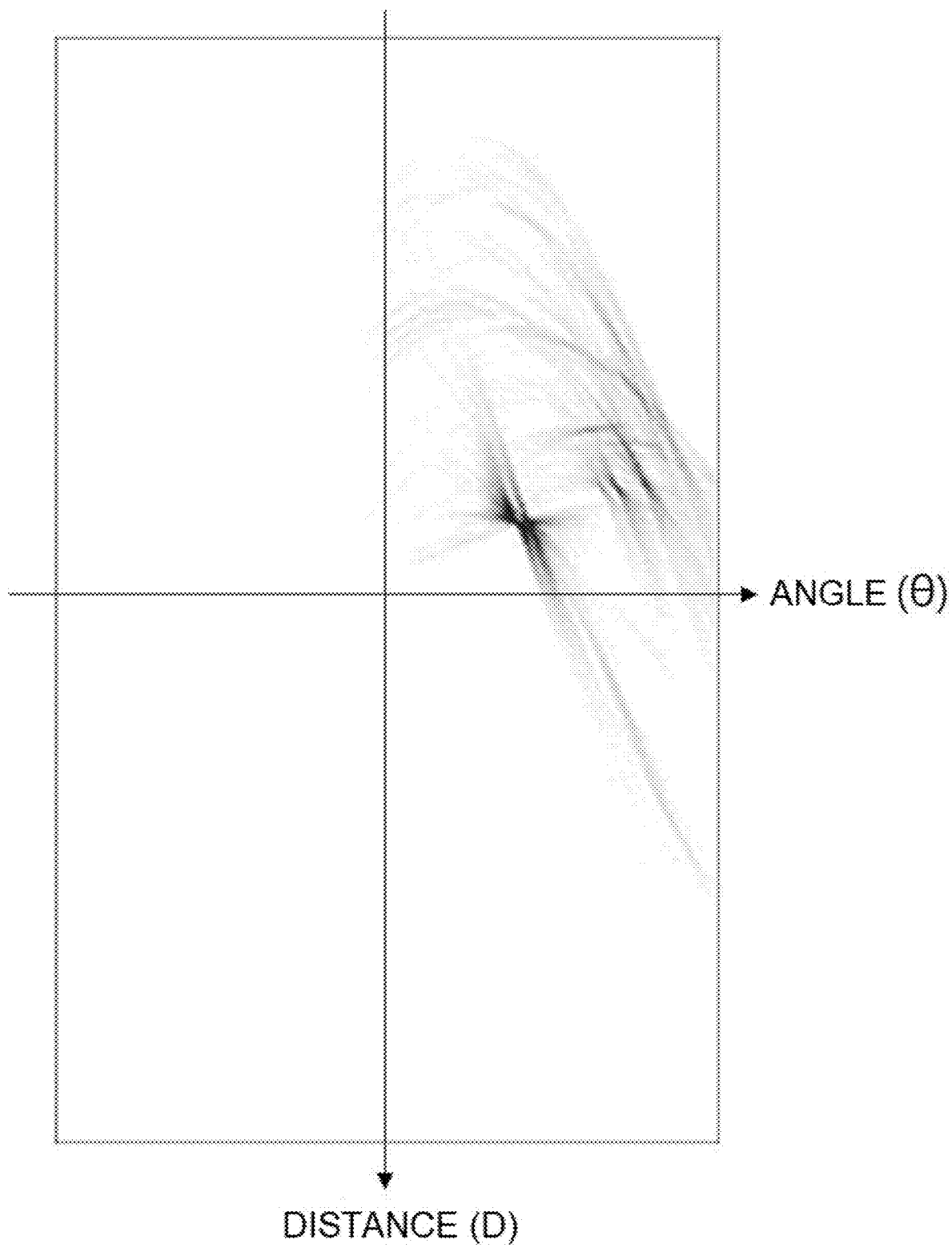
FIG. 3 is a diagram showing an example of an operation of generating a Hough space with respect to an edge of FIG. 2B.

For example, as shown in FIG. 2B, a horizontal element edge may be acquired from an image, and as shown in FIG. 3, the Hough space with respect to the horizontal element edge may be generated through Hough transformation.

That is, the Hough space may be generated by detecting a straight line element through Hough transformation on an edge of the image, and for reference, Hough transformation is performed by transforming all straight lines passing through one point into a sine curve, and in this regard, gradients of brightness values of all pixels configuring the edge with respect to the x- and y-axes are calculated, a local angle with respect to each point of the edge is calculated using the gradients, and Hough transformation is performed using information on a distance D and an angle θ from the origin of the pixels.

Subsequently, in the recognizing the upper straight line of the median strip (S130), the upper straight line of the median strip may be recognized form the Hough space.

Here, among a plurality of straight lines in the Hough space, a straight line positioned at the uppermost end, other than a lane, may be recognized as the upper straight line of the median strip.

Figure 4:
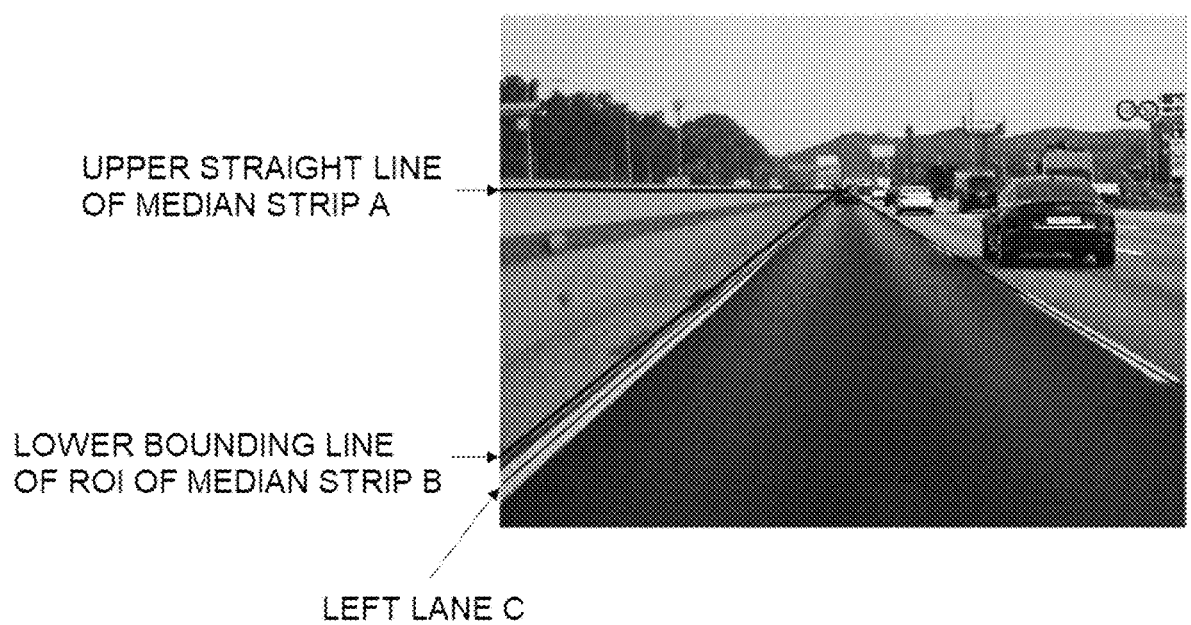
FIG. 4 is a diagram showing an example of an operation of generating a region of interest (ROI) of FIG. 1A.

That is, as shown in FIG. 3, the possibility that points at which a plurality of sine curves overlap each other on the Hough space correspond to a straight line is high, and thus assuming that the possibility that the points correspond to a straight line passing through an actual edge is high, as shown in FIG. 4, among a plurality of straight lines, a straight line positioned at the uppermost end, other than a lane, may be determined and recognized as the upper straight line of the median strip.

Subsequently, in the generating the ROI of the median strip (S140), the objects around the median strip may be detected by generating the ROI of the median strip using information on the upper straight line of the median strip and the lane.

Here, the ROI of the median strip may be generated using information on coordinates of an image of the upper straight line of the median strip and a left lane.

For example, as shown in FIG. 4, the ROI of the median strip may be generated using information on coordinates of an image configured by representing a straight line of the above recognized upper straight line A of the median strip and a straight line of a left lane C detected by a lane departure warning system (LDWS) of a moving vehicle based on a lower bounding line B of the ROI of the median strip.

Subsequently, in the detecting the object (S150), the object may be detected from the internal part of the ROI of the median strip through the labeling scheme.

Here, the object may also be detected by performing the labeling scheme to separate objects having 8-connectivity from an edge present in the ROI of the median strip.

Figure 5A:
FIG. 5A is a diagram showing an example of an image of an edge of an internal part of an ROI of a median strip of FIG. 4.
Figure 5B:
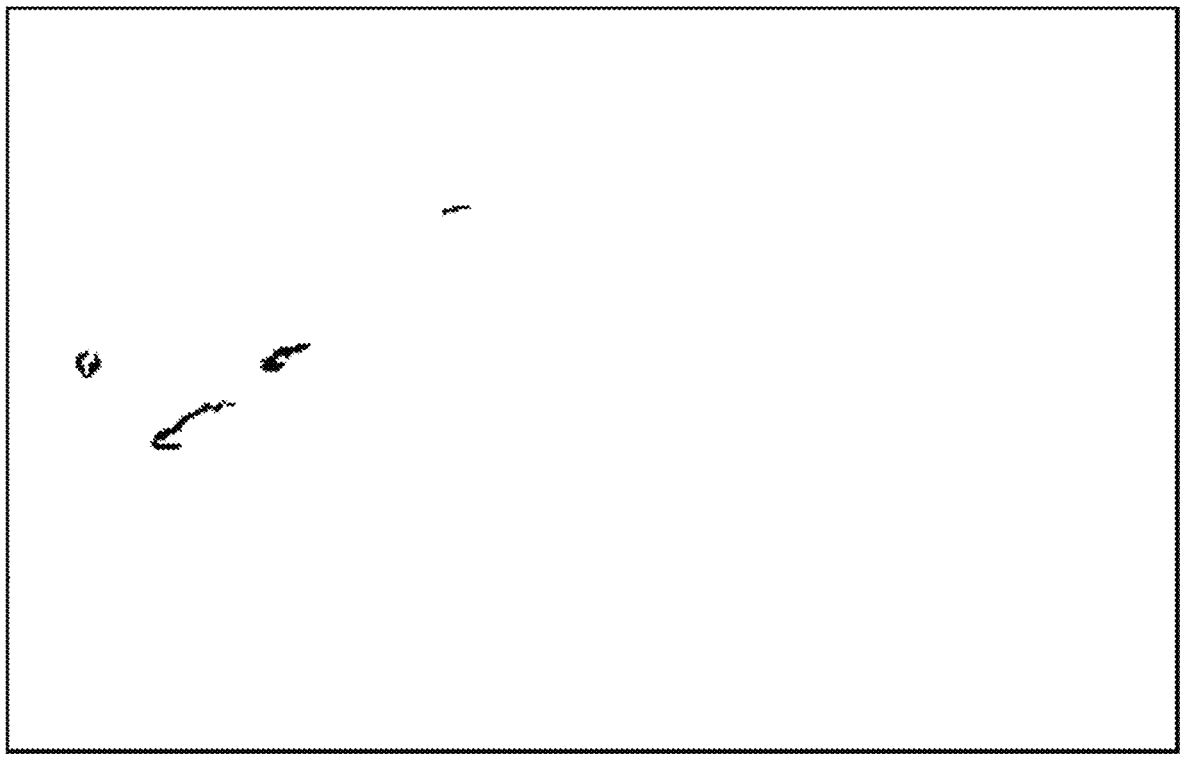
FIG. 5B is a diagram showing an example of an operation of detecting an object of FIG. 5A.

That is, whether each pixel has 8-connectivity in an image of the edge in the ROI of the median strip of FIG. 5A may be examined, and a shown in FIG. 5B, a labeling algorithm for separating individual objects from the edge may be performed to detect objects corresponding to a predetermined size.

Subsequently, in the determining the tracking-point set (S160), the tracking-point set of the objects that satisfy a specific condition may be determined.

Here, in order to track a meaningful object, speed of the tracking point and the speed of the moving vehicle need to be assumed to be the same for the purpose of removing meaningless objects from sequential images.

In detail, the determining the tracking-point set may include storing object coordinates in a time series of objects to be detected from all images in a memory having a first-in-first-out (FIFO) structure with respect to N recent frames and maintaining the object coordinates in a set of objects, and determining a set of objects that satisfy a first condition, in which the difference between lateral distances in a world coordinate system at the positions of objects being tracked, which correspond to a $k^{th}$ frame and a $(k-1)^{th}$ frame, is the minimum value, and a second condition in which, when the height of an object in the world coordinate system is 0, the speed of a moving vehicle and the speed of an object are the same, and when the height of the object is greater than 0, the speed of the object is greater than the speed of the moving vehicle, as the tracking-point set.

Figure 6A:
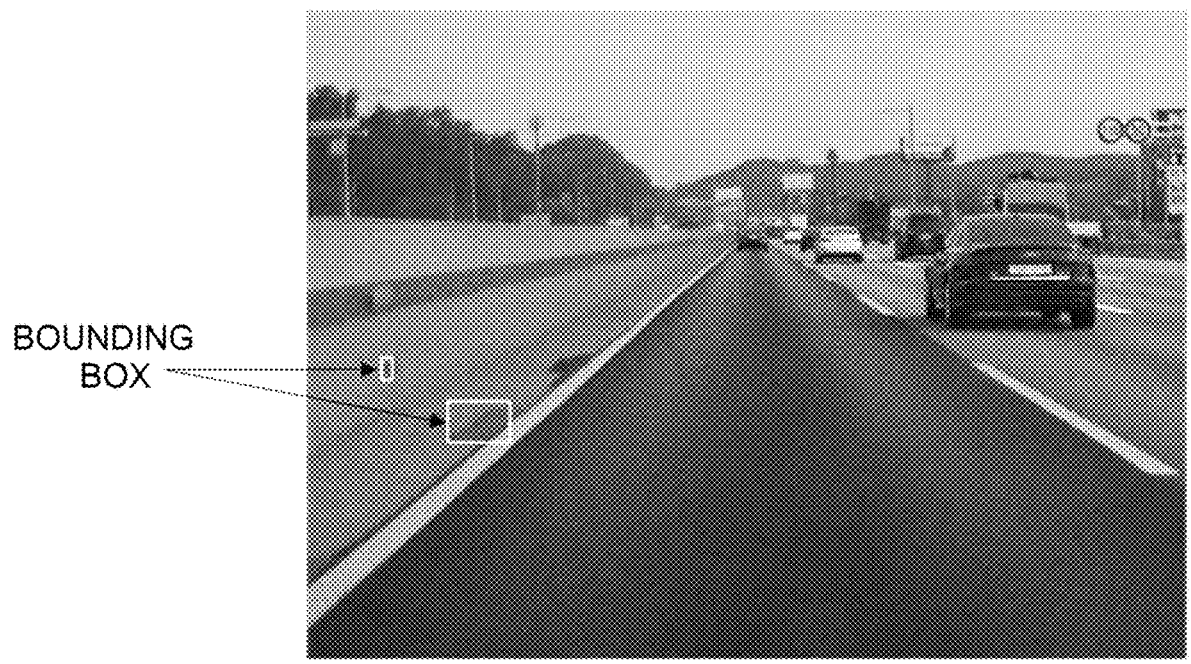
FIG. 6A is a diagram showing an example of a bounding box of an object of FIG. 5B.
Figure 6B:
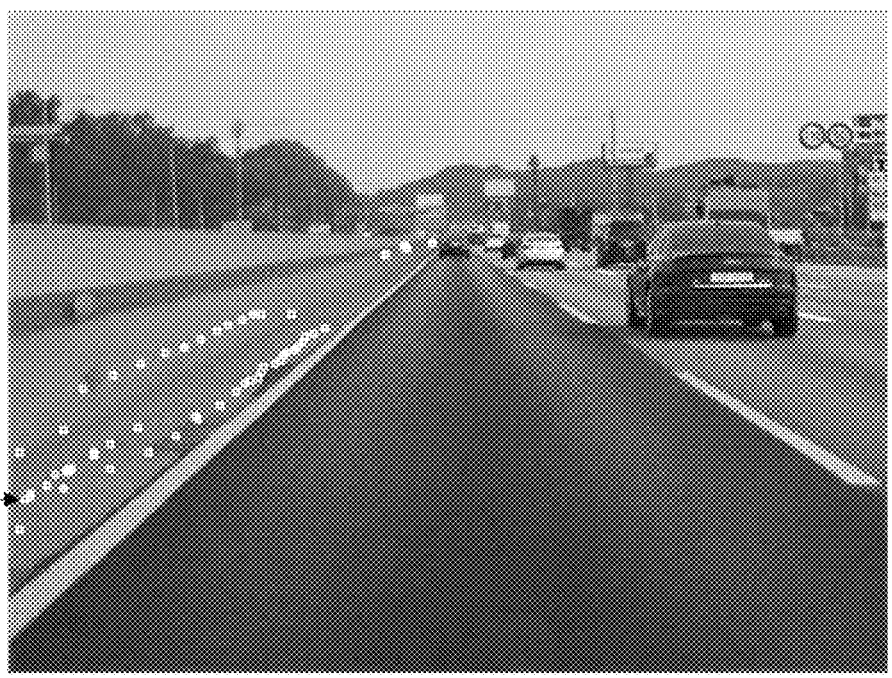
FIG. 6B is a diagram showing an example of overlapping images of object coordinates of N frames.

For reference, the object coordinate refers to coordinates of a lower-left end of a bounding box surrounding an object, and the coordinates of the lower-left end are object coordinates representing the position of the object in FIG. 6A, and all object coordinates detected from N frames are indicated to overlap each other on a current single frame in FIG. 6B.

The procedure for determining a tracking-point set will be described below in more detail.

First, a history set H of an object may be defined using Equations 1 and 2 with respect to N frames.

$$S(f)=\{(x_i,y_i),(X_i,Y_i,0)|i=1,\ldots,n\} \qquad \text{[Equation 1]}$$

$$H=\{S(f)|f=k,\ldots,k-N\} \qquad \text{[Equation 2]}$$

Here, s(f) is a set of object coordinates in image frame #f, $(x_i, y_i)$ is image coordinates of an object, $(X_i, Y_i)$ is world coordinates when the height of the object is assumed to be 0, and the history set H is a set of coordinates of objects in a $k^{th}$ frame from a $(k-N)^{th}$ frame, that is, before an $N^{th}$ frame from the current frame.

Then, the aforementioned first condition may be used to detect a tracking point by applying the connectivity for time between objects configuring the history set H, and the first condition may be defined using Equation 3 below.

[Equation 3]

$$D_X = \sqrt{(X_{i(f)} - X_{i(f-1)})^2}$$

Here, $D_x$ is the distance between a world coordinate X of an $i^{th}$ object in a $f^{th}$ frame and a world coordinate X of an $i^{th}$ object in a $(f-1)^{th}$ frame.

That is, the first condition corresponds to the assumption in that "A difference between a lateral distance $X_f$ in the current frame and a lateral distance $X_{f-1}$ in a previous frame in a world coordinate system of an object being tracked is the minimum value".

The second condition may be defined using Equation 4 below.

$$V_{SV} = V_{obj} \text{ if } Z=0$$

$$V_{SV} < V_{obj} \text{ if } Z>0 \quad \text{[Equation 4]}$$

Here, Z is the height of an object in the world coordinate system, $V_{SV}$ is the speed of a moving vehicle, and $V_{obj}$ is the speed of an object.

That is, the object being tracked has a speed, and thus the speed of the object may be equal to or greater than the speed of the moving vehicle.

The speed of the object may be calculated using Equations 5 and 6 below.

[Equation 5]

$$D = \sqrt{(X_{i(f)} - X_{i(f-1)})^2 + (Y_{i(f)} - Y_{i(f-1)})^2}$$

[Equation 6]

$$V_{obj} = \frac{D \text{ (mm)}}{1 \text{(frame)}} = D \text{ (mm/frame)}$$

Here, D is a Euclidean distance between world coordinates of a $f^{th}$ frame and world coordinates of a $(f-1)^{th}$ frame, and $V_{obj}$ is a moving distance per frame.

In order to determine the tracking-point set, the difference between the speed of an object and the speed of a moving vehicle needs to have a predetermined value depending on a frame, and when a standard deviation a, defined using Equation 7 below, is smaller than a specific threshold, the tracking-point set may be determined as a tracking-point set T defined using Equation 8 below.

[Equation 7]

$$V_\delta = V_{obj} - V_{SV}$$

$$\sigma = \sqrt{\frac{\sum_{f=1}^{n} (V_\delta^f - \mu)^2}{n}}$$

$$\mu = \frac{\sum_{f=1}^{n} V_\delta^f}{n}$$

$$T = \{t(i) | i=1, \ldots, n\}$$

$$t(i) = \{(x_f, y_f), (X_f, Y_f, 0) | f=k, \ldots, k-m\} \quad \text{[Equation 8]}$$

Here, $V_\delta$ is the difference between $V_{obj}$ and $V_{SV}$, σ is a standard deviation of $V_\delta$ in a set of n frames, μ is an average of $V_\delta$, t(i) is an $i^{th}$ tracking-point set including image coordinates $(x_f, y_f)$ and world coordinates $(X_f, Y_f, 0)$, and T is an entire tracking-point set.

Thus, elements of the tracking-point set (t(i)) may include image coordinates and world coordinates, and the number of tracking-point sets may be n.

In order to determine or estimate the position of the lower straight line of the median strip that is the lower bounding line of the median strip, the height of world coordinates of a tracking-point set including tracking points having a height greater than 0 may be acquired, and one coordinate of world coordinates (X, Y, Z) may be assumed in order to convert image coordinates in a perspective transformation model into world coordinates, and according to the present embodiment, a coordinate X at a lateral distance may be assumed.

Thus, the forward distance Y and the height Z of world coordinates may be calculated by inputting a lateral distance X between the image coordinates (x, y) and world coordinates, and tracking points may be obtained by converting an image coordinate of an object into world coordinates using Equation 9 below.

[Equation 9]

$$w_h = [PCRG]^{-1} c_h$$

$$c_i = \begin{bmatrix} \frac{\lambda x_c}{\lambda - z_c} \\ \frac{\lambda y_c}{\lambda - z_c} \end{bmatrix}$$

Here, $W_h = [X, Y, Z, 1]^T$ is a world coordinate system, $c_i = [x_i, y_i]^T$ is an image coordinate system, $c_h = [x_c, y_c, z_c]^T$ is a coordinate system of a camera, P is a perspective transformation matrix, C is displacement of an image plane origin, R is rotational transform, and G is a displacement transformation matrix of the camera.

When the average speed of tracking points of a tracking-point set is determined to be greater than the average speed of a moving vehicle with respect to m frames using Equation 10 below, a tracking-point set having a predetermined height may be recognized as an object on a side surface of the median strip.

$$\overline{V}_{SV} < \overline{V}_{obj} \quad \text{[Equation 10]}$$

That is, when average speed of the moving vehicles is greater than average speed of the tracking points, the tracking-point set has a predetermined height, and thus may be recognized as an object on the side surface of the median strip.

Figure 6C:
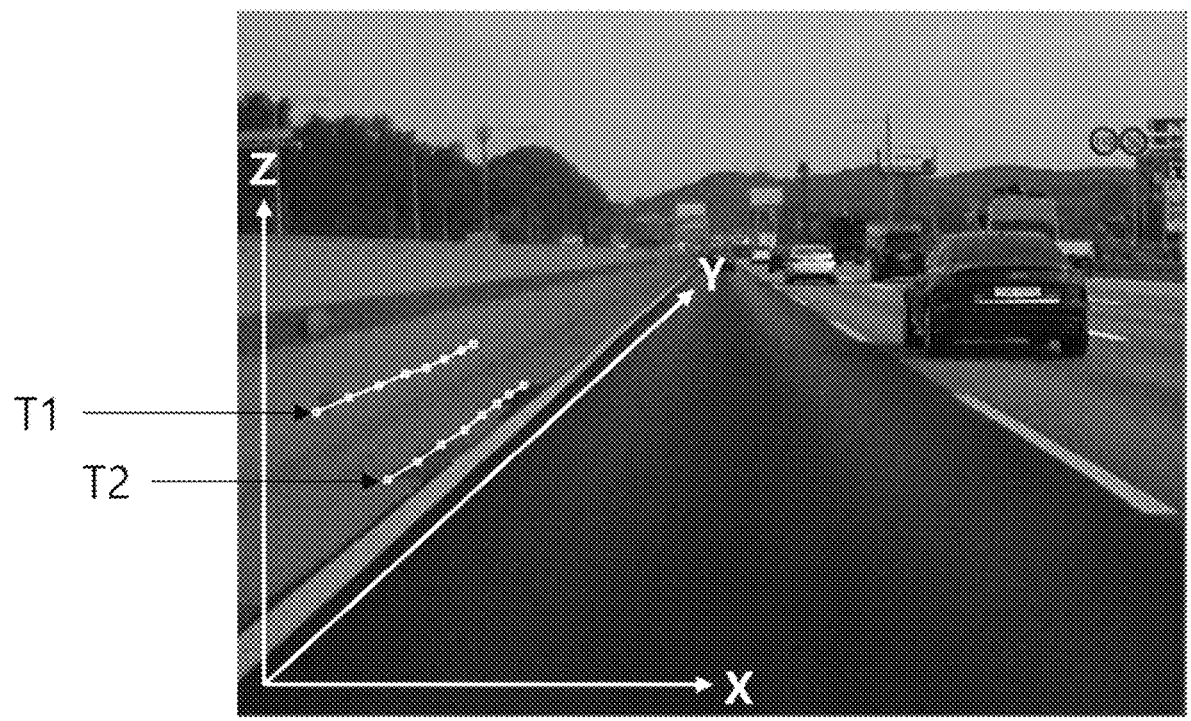
FIG. 6C is a diagram showing an example of a tracking-point set.

Through the above procedure, the tracking-point set may be determined by the first tracking-point set on the side surface of the median strip, having a predetermined height, and the second tracking-point set on a bottom surface. FIG. 6C illustrates a tracking-point set T1 on a side surface of a median strip having 8 tracking points and a tracking-point set T2 of a bottom surface of the median strip having 8 tracking points.

As described above, the speed of tracking points between two frames of the tracking points having a predetermined height from world coordinates (X, Y, Z) calculated using Equation 9 above may be defined as the moving distance per frame using Equations 17 and 18 below.

[Equation 17]

$$D_{3d} = \sqrt{(X_{i(f)} - X_{i(f-1)})^2 + (Y_{i(f)} - Y_{i(f-1)})^2 + (Z_{i(f)} - Z_{i(f-1)})^2}$$

[Equation 18]

$$V_{obj} = \frac{D_{3d} \text{ (mm)}}{1 \text{(frame)}} = D_{3d} \text{ (mm/frame)}$$

Here, $(X_{i(f)}, Y_{i(f)}, Z_{i(f)})$ corresponds to world coordinates of a tracking point of an $f^{th}$ frame that is the current frame, $(X_{i(f-1)}, Y_{i(f-1)}, Z_{i(f-1)})$ corresponds to world coordinates of a tracking point of a $(f-1)^{th}$ frame that is the previous frame, X is a lateral distance, Y is a forward distance, and Z is a height.

Here, a procedure of accurately calculating world coordinates of a tracking point having a predetermined height may be a procedure of equalizing the moving speed of a current tracking point and moving speed of a moving vehicle and will be described below.

A condition based on Equation 19 below needs to be satisfied.

$$\nabla f = V_{obj} - V_{SV} = 0 \quad [\text{Equation 19}]$$

Here, $\nabla f$ is a speed gradient, and a condition in which moving speed of a tracking point and moving speed of a moving vehicle are the same needs to be satisfied.

The moving speed $V_0$ of an initial tracking point, at which Z of a tracking point having a predetermined height is assumed to be 0, may always be greater than the moving speed $V_{SV}$ of a moving vehicle, and thus an initial speed gradient $\nabla f_0$ may be greater than 0, as in Equation 20 below.

$$\nabla f_0 = V_0 - V_{SV} > 0 \quad [\text{Equation 20}]$$

Objects on a lane or between the lane and the median strip, which are objects having a height of 0 around the median strip are adjacent to the X-axis of a world coordinate system, and thus accurate world coordinates of an object having a predetermined height positioned on the side surface of the median strip may be easily predicted when a lateral distance X is determined as a variable.

In actual programming, when a lateral coordinate X is changed stepwise by a constant $\delta_x$ through repetitive iteration of a statement having a condition represented using Equation 21 below, $V_{obj}$ may be reduced to thereby approach the condition of Equation 19 above.

$$X_{new} = X_{old} + \delta x \text{ if } (\nabla f > \varepsilon) \quad [\text{Equation 21}]$$

Here, $X_{old}$ is a lateral coordinate of a previous stage, an initial value is the value closest to the median strip in a lateral direction among objects on a bottom surface, $\delta_x$ is displacement for changing X, $X_{new}$ is a new changed lateral coordinate, c is an allowable threshold, repetition is terminated when the value of Equation 19 above is smaller than c, and the final $X_{new}$ is the lateral distance between objects.

Subsequently, in the determining whether the lower straight line of the median strip is present (S170), whether the lower straight line of the median strip is present from the Hough space between the first tracking point on the side surface of the median strip having a predetermined height from the tracking-point set and the second tracking point on the bottom surface is determined.

Subsequently, according to whether the lower straight line of the median strip is detected, the method may branch into determining (S180A) or estimating (S180B) the lower straight line of the median strip.

Here, when a straight line is present on the Hough space between the first tracking point and the second tracking point, the straight line may be determined as the lower straight line of the median strip, and when a straight line is not present, the lower straight line of the median strip may be estimated, in which case the lower straight line of the median strip may be estimated from the world coordinate of the first tracking point of the object on the side surface of the median strip or the second tracking point on the bottom surface.

With reference to FIG. 1B, a procedure for estimating a lower straight line of a median strip will be described below in detail.

First, whether the first tracking-point set T1 and the second tracking-point set T2 are both present may be determined (S181), and when the first tracking-point set T1 and the second tracking-point set T2 are both present, the lower straight line of the median strip is present between the world coordinate of the object on the bottom surface and the object on the side surface of the median strip obtained in the aforementioned determining the tracking-point set (S160), and thus an equation of the lower straight line of the median strip, which passes through an intermediate value of $X_1$ and $X_2$, may be calculated using Equation 11 below (S182).

[Equation 11]

$$X_{dw} = \frac{X_1 + X_2}{2}$$

Here, $X_{dw}$ is a lateral coordinate of the lower straight line of the median strip, $X_1$ is a lateral coordinate of a tracking point on the side surface of the median strip, and $X_2$ is a lateral coordinate of a tracking point on the bottom surface.

Figure 7:
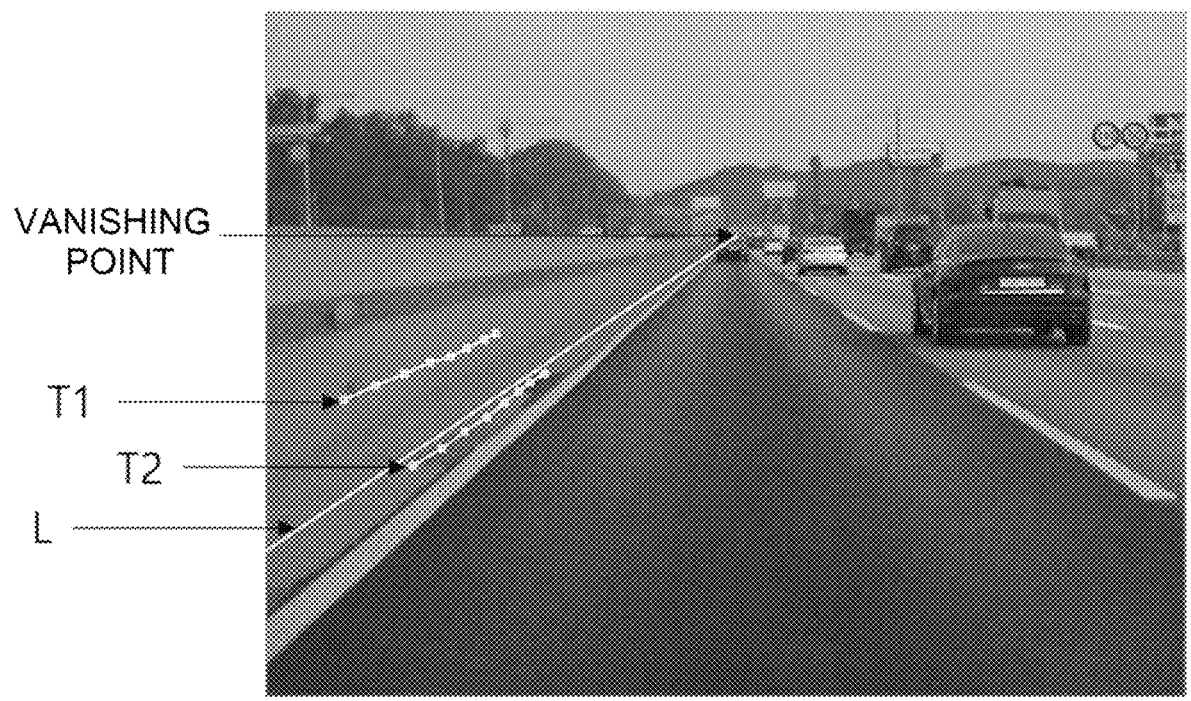
FIG. 7 is a diagram showing an example of a lower straight line of a median strip.

For example, when $X_1$ is −1.987 m and $X_2$ is −1.664 m, a coordinate of an image at a short distance may be obtained by setting world coordinates of the short distance to X=−1.8255 m, Y=0, and Z=0, and a straight line L passing through a coordinate of an image at a short distance and the coordinates of an image at a long distance may be estimated as the lower straight line of the median strip using a vanishing point obtained from the LDWS as the coordinates of the image at the long distance, as shown in FIG. 7.

A lateral coordinate of a lower straight line of a median strip in the current frame may be defined using Equations 22, 13, and 14 below.

$$X_\delta = X_L - X_{dw} \quad [\text{Equation 22}]$$

Here, $X_\delta$ is a lateral difference of the lower straight line of the median strip with respect to a lane, $X_L$ is a lateral world coordinate of a left lane, provided from the LDWS, and average data of $X_\delta$ may use a moving average filter defined using Equation 13 below.

[Equation 13]

$$\hat{x}_k = \frac{n-1}{n}\hat{x}_{k-1} + \frac{1}{n}X_\delta$$

Here, $\hat{x}_k$ is average data of $X_\delta$ passing through the moving average filter, $\hat{x}_{k-1}$ is average data of $X_\delta$ obtained in a previous stage, n is the number of pieces of data on the time axis for calculating an average, k is the current frame, (k−1) is a previous frame, and a lateral coordinate of the lower straight line of the median strip to which a result value $\hat{x}_k$ of the moving average filter is applied may be calculated using Equation 14 below.

$$X_{dw}^f = S_L - \hat{x}_k \quad [\text{Equation 14}]$$

Here, $X^f_{dw}$ is a lateral coordinate of the lower straight line of the median strip in the current frame.

Second, a method of estimating the lower straight line of the median strip when a vehicle travels for a long time in the state in which the lower straight line of the median strip is not seen will be described below.

When only the first tracking-point set T1, that is, the tracking-point set on the side surface of the median strip, is present (S183), the lower straight line of the median strip may be estimated by correcting a coordinate of the lower straight line of the median strip using Equations 12 to 14 below.

$$X_\delta = X_L - X_1 \text{ if } X_1 > X_{dw}^{f-1}$$ [Equation 12]

Here, $X_\delta$ is a lateral difference of the lower straight line of the median strip with respect to a lane, $X_L$ is a lateral world coordinate of a left lane, and $X^{f-1}_{dw}$ is a lateral coordinate of the lower straight line of the median strip in a previous frame.

$X_\delta$ calculated using Equation 12 above may be corrected using Equation 13 above, and when $X^{f-1}_{dw}$ is not smaller than $X_1$, the coordinates of the lower straight line of the median strip may be maintained, and the lower straight line of the median strip may be estimated (S184).

That is, $X^f_{dw}$ in the current frame may be determined by comparing a coordinate $X_1$ of the first tracking-point set T1 and a lateral coordinate $X^{f-1}_{dw}$ of the lower straight line of the median strip.

When only the second tracking-point set T2 on the bottom surface of the median strip is present (S185), the lower straight line of the median strip may be estimated by correcting a coordinate of the lower straight line of the median strip using Equations 13, 14, and 15 below.

$$X_\delta = X_L - X_2 \text{ if } X_2 < X_{dw}^{f-1}$$ [Equation 15]

Here, a lateral coordinate of the lower straight line of the median strip in the current frame may be corrected by applying $X_\delta$, calculated using Equation 15, to Equations 13 and 14, and when $X^{f-1}_{dw}$ is not smaller than $X_2$, the coordinates of the lower straight line of the median strip may be maintained, and the lower straight line of the median strip may be estimated (S186).

That is, $X^f_{dw}$ in the current frame may be determined by comparing a coordinate $X_2$ of the second tracking-point set T2 with a lateral coordinate $X^{f-1}_{dw}$ of the lower straight line of the median strip.

Subsequently, in the predicting the collision (S190), the predicted collision position and the predicted collision time may be predicted by detecting an intersection point between the determined or estimated lower straight line of the median strip and a traveling-path straight line of a vehicle.

Here, the predicted collision position may be determined as the intersection point between the lower straight line of the median strip and a predicted path straight line of a moving vehicle, and the predicted collision time may be defined using Equation 16 below.

$$TTC = d_i / V_{SV}$$ [Equation 16]

Here, a time to collision (TTC) is a predicted collision time, $d_i$ is a predicted collision distance with respect to a median strip, and $V_{SV}$ is a speed of the moving vehicle.

The predicted path straight line may be acquired through two world coordinates and the distance to the left side surface from the center of the moving vehicle under the assumption that the steering wheel of the moving vehicle is not being manipulated.

That is, the predicted path straight line may be a straight line passing through short-distance world coordinates of a coordinate X corresponding to ½ of the area of the moving vehicle and a coordinate Y corresponding to a forward distance of 0 m, and long-distance world coordinates of a coordinate X corresponding to ½ of the area of the moving vehicle and a coordinate Y corresponding to a forward distance of 1000 m.

Figure 8A:
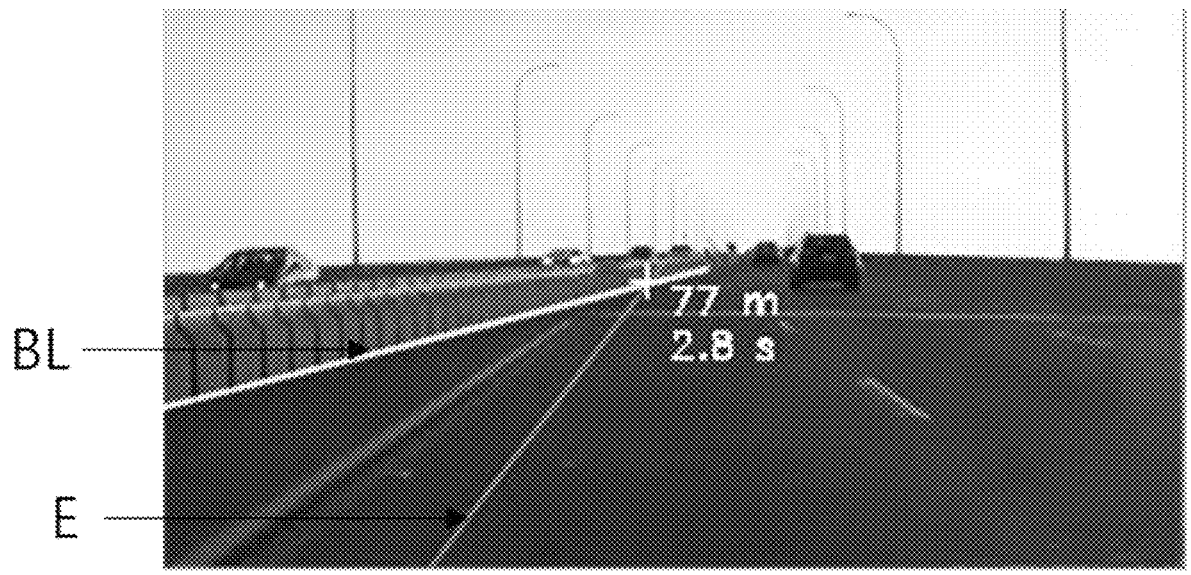
FIGS. 8A and 8B are diagrams showing an example of a predicted collision position and a predicted collision time.

For example, as shown in FIG. 8A, E is a predicted path straight line of the moving vehicle, BL is the recognized lower straight line of the median strip, an intersection point of two straight lines indicated by a cross line is a predicted collision position, and the predicted collision distance $d_i$ is a forward distance Y in world coordinates of the intersection point.

Figure 8B:
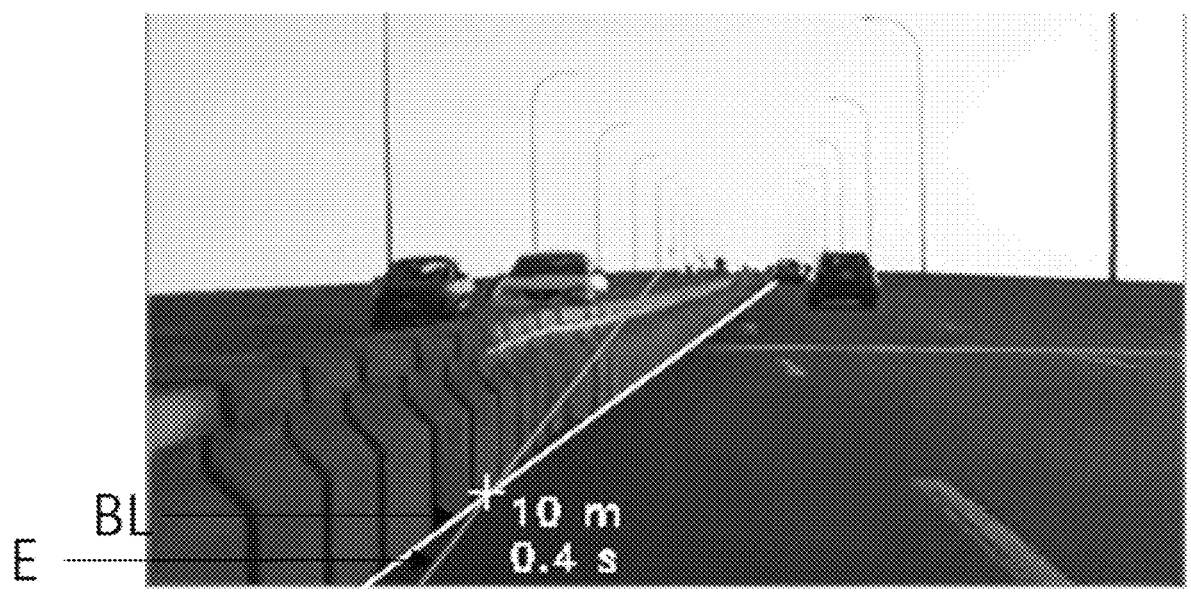

For example, referring to FIG. 8A, when the predicted collision distance with respect to the median strip is 77 m and speed of the moving vehicle is 100 km/h, TTC is 2.8 sec, and referring to FIG. 8B, when the vehicle approaches the median strip without manipulation of a steering wheel, the predicted collision distance is 10 m, and when the speed of the moving vehicle is 100 km/h, TTC is 0.4 sec.

Lastly, in providing warning information (S200), a warning information about the median strip at the above calculated predicted collision position and predicted collision time may be provided, in which case the warning information about the median strip may be provided through an image and sound of a navigation device, vibration of a steering device, or sound of a speaker of a vehicle, or a vehicle may be maintained in a lane by autonomously adjusting the steering device in conjunction with a lane-keeping assistance system based on the warning information about the median strip.

Thus, with regard to the aforementioned configuration of a method of recognizing a median strip and predicting risk of a collision through analysis of an image, a collision accident may be prevented through the warning information by recognizing the movement and the height of an object even for a road on which a concrete median strip, from which it is impossible to recognize a lower straight line of a median strip due to the similarity of colors of the median strip and a bottom surface, is installed, to estimate the position of a lower straight line of the median strip and by calculating the predicted collision distance and the predicted collision time.

According to the present disclosure, a collision accident may be prevented through provision of the warning information by recognizing the movement and the height of an object even in a road on which a concrete median strip, from which it is impossible to recognize a lower straight line of a median strip due to the similarity of colors of the median strip and a bottom surface, is installed, to estimate the position of a lower straight line of the median strip and by calculating the predicted collision distance and the predicted collision time.

The foregoing exemplary embodiments and advantages are merely exemplary and are not to be construed as limiting the present disclosure. The present teachings can be readily applied to other types of apparatuses. Also, the description of the exemplary embodiments of the present disclosure is intended to be illustrative, rather than to limit the scope of the claims, and many alternatives, modifications, and variations will be apparent to those skilled in the art.

What is claimed is:

1. A method of recognizing a median strip and predicting risk of a collision through analysis of an image, the method comprising:

acquiring an image of the road ahead comprising a median strip and a road bottom surface through a camera of a moving vehicle;

generating a Hough space by detecting an edge from the image;

recognizing an upper straight line of the median strip from the Hough space;

generating a region of interest (ROI) of the median strip using information on the upper straight line of the median strip and a lane;

detecting an object from an internal part of the ROI of the median strip through a labeling scheme;

determining a tracking-point set of the objects that satisfy a specific condition;

determining whether a lower straight line of the median strip from the Hough space is present between a first tracking point on a side surface of the median strip having a predetermined height from the tracking-point set and a second tracking point on a bottom surface;

determining or estimating the lower straight line of the median strip according to whether the lower straight line of the median strip is detected; and predicting a predicted collision position and a predicted collision time by detecting an intersection point between the determined or estimated lower straight line of the median strip and a traveling-path straight line of the vehicle, wherein the determining the tracking-point set comprises:

storing object coordinates in a time series of the objects in a memory having a first-in-first-out (FIFO) structure with respect to N frames and maintaining the object coordinates in a set of objects; and determining a set of objects that satisfy a first condition, in which a difference between lateral distances in a world coordinate system at the positions of the objects being tracked, which correspond to a $k^{th}$ frame and a $(k-1)^{th}$ frame, is a minimum value and a second condition in which, when a height of the object in the world coordinate system is 0, a speed of the moving vehicle and a speed of the object are the same, and when the height of the object is greater than 0, the speed of the object is greater than the speed of the moving vehicle, as the tracking-point set.

2. The method of claim 1, wherein the generating a Hough space by detecting an edge from the image comprises:

generating a Hough space by detecting a straight line element through Hough transformation on the edge of the image.

3. The method of claim 1, wherein, among a plurality of straight lines in the Hough space, a straight line positioned at an uppermost end, other than the lane, is recognized as the upper straight line of the median strip.

4. The method of claim 1, wherein a region of interest (ROI) of the median strip is generated using information on coordinates of an image of the upper straight line of the median strip and a left lane.

5. The method of claim 1, wherein the object is detected by performing the labeling scheme to separate objects having 8-connectivity from an edge present in the ROI of the median strip.

6. The method of claim 1, wherein an edge is detected by removing a repetitive noise pattern from the image of the road ahead during rain, snow, or fog.

7. The method of claim 1, wherein a history set H of an object is defined using Equations 1 and 2 with respect to the N frames:

$$S(f)=\{(x_i,y_i),(X_i,Y_i,0)|i=1,\ldots,n\} \quad \text{[Equation 1]}$$

$$H=\{S(f)|f=k,\ldots,k-N\} \quad \text{[Equation 2]}$$

where s(f) is a set of object coordinates in image frame #f, $(x_i, y_i)$ is image coordinates of an object, $(X_i, Y_i)$ is world coordinates when a height of the object is assumed to be 0, and the history set H is a set of coordinates of objects in a $k^{th}$ frame from a $(k-N)^{th}$ frame;

wherein the first condition is defined using Equation 3 below:

[Equation 3]

$$D_X = \sqrt{(X_{i(f)} - X_{i(f-1)})^2}$$

where $D_x$ is a distance between a world coordinate X of an $i^{th}$ object in an $f^{th}$ frame and a world coordinate X of an $i^{th}$ object in a $(f-1)^{th}$ frame; and wherein the second condition is defined using Equation 4 below:

$$V_{SV}=V_{obj} \text{ if } Z=0$$

$$V_{SV}<V_{obj} \text{ if } Z>0 \quad \text{[Equation 4]}$$

where Z is a height of the object in the world coordinate system, $V_{SV}$ is the speed of the moving vehicle, and $V_{obj}$ is the speed of the object.

8. The method of claim 7, wherein the speed of the object is calculated using Equations 5 and 6 below:

[Equation 5]

$$D = \sqrt{(X_{i(f)} - X_{i(f-1)})^2 + (Y_{i(f)} - Y_{i(f-1)})^2}$$

[Equation 6]

$$V_{obj} = \frac{D \text{ (mm)}}{1 \text{(frame)}} = D \text{ (mm/frame)}$$

where D is a Euclidean distance between world coordinates of an $f^{th}$ frame and world coordinates of an $(f-1)^{th}$ frame, and $V_{obj}$ is a moving distance per frame; and wherein, when a standard deviation $\sigma$ defined using Equation 7 below is smaller than a specific threshold, the tracking-point set is determined as the tracking-point set T defined using Equation 8 below:

[Equation 7]

$$V_\delta = V_{obj} - V_{SV}$$

$$\sigma = \sqrt{\frac{\sum_{f=1}^{n}(V_\delta^f - \mu)^2}{n}}$$

$$\mu = \frac{\sum_{f=1}^{n} V_\delta^f}{n}$$

$$T=\{t(i)|i=1,\ldots,n\}$$

$$t(i)=\{(x_f,y_f),(X_f,Y_f,0)|f=k,\ldots,k-m\} \quad \text{[Equation 8]}$$

where $V_\delta$ is a difference between $V_{obj}$ and $V_{SV}$, $\sigma$ is a standard deviation of $V_\delta$ in a set of n frames, $\mu$ is an average of $V_\delta$, t(i) is an $i^{th}$ tracking-point set comprising image coordinates $(x_f, y_f)$ and world coordinates $(X_f, Y_f, 0)$, and T is an entire tracking-point set.

9. The method of claim 1, wherein tracking points of the tracking-point set are obtained by converting image coordinates of the object into world coordinates using Equation 9 below:

[Equation 9]

$$w_h = [PCRG]^{-1} c_h$$

$$c_i = \begin{bmatrix} \dfrac{\lambda x_c}{\lambda - z_c} \\ \dfrac{\lambda y_c}{\lambda - z_c} \end{bmatrix}$$

where $W_h=[X,Y,Z,1]^T$ is a world coordinate system, $c_i=[x_i,y_i]^T$, is an image coordinate system, $c_h=[x_c,y_c,z_c]^T$ is a coordinate system of a camera, P is a perspective transformation matrix, C is displacement of an image plane origin, R is rotational transform, and G is a displacement transformation matrix of the camera; and wherein, when an average speed of the tracking points of the tracking-point set is greater than an average speed of the moving vehicle with respect to m frames, determined using Equation 10 below, a tracking-point set having a predetermined height is recognized as an object on a side surface of the median strip:

$$\overline{V}_{SV} = \overline{V}_{obj}. \qquad \text{[Equation 10]}$$

10. The method of claim 1, wherein, when a straight line is present on the Hough space between the first tracking point and the second tracking point, the straight line is determined as the lower straight line of the median strip, and when a straight line is not present, the lower straight line of the median strip is estimated.

11. The method of claim 10, wherein the lower straight line of the median strip is estimated from world coordinates of the first tracking point of the object on the side surface of the median strip or the second tracking point on the bottom surface.

12. The method of claim 11, wherein, whether the first tracking-point set and the second tracking-point set are both present is determined, and when the first tracking-point set and the second tracking-point set are both present, an equation of the lower straight line of the median strip is calculated using Equation 11 below:

[Equation 11]

$$X_{dw} = \dfrac{X_1 + X_2}{2}$$

where $X_{dw}$ is a lateral coordinate of the lower straight line of the median strip, $X_1$ is a lateral coordinate of the first tracking point, and $X_2$ is a lateral coordinate of the second tracking point;

wherein, when only the first tracking-point set is present, the lower straight line of the median strip is estimated by correcting coordinates of the lower straight line of the median strip using Equations 12 to 14 below:

$$X_\delta = X_L - X_1 \text{ if } X_1 > X_{dw}^{f-1} \qquad \text{[Equation 12]}$$

where $X_\delta$ is a lateral difference of the lower straight line of the median strip with respect to a lane, $X_L$ is a lateral world coordinate of a left lane, and $X^{f-1}_{dw}$ is a lateral coordinate of the lower straight line of the median strip in a previous frame:

[Equation 13]

$$\hat{x}_k = \dfrac{n-1}{n} \hat{x}_{k-1} + \dfrac{1}{n} X_\delta$$

where Equation 13 above is a moving average filter for calculating average data of $X_\delta$, $\hat{x}_k$ is average data of $X_\delta$ passing through the moving average filter, $\hat{x}_{k-1}$ is average data of $X_\delta$ obtained in a previous stage, and $X_\delta$ calculated using Equation 12 above is corrected by applying Equation 13 above:

$$X_{dw}^f = X_L - \hat{x}_k \qquad \text{[Equation 14]}$$

where $X^f_{dw}$ is a lateral coordinate of the lower straight line of the median strip in a current frame;

wherein, when $X^{f-1}_{dw}$ is not smaller than $X_1$, coordinates of the lower straight line of the median strip are maintained, and the lower straight line of the median strip is estimated; and wherein, when only the second tracking-point set is present, the lower straight line of the median strip is estimated by correcting coordinates of the lower straight line of the median strip using Equations 13 and 14 and Equation 15 below:

[Equation 15]

$$X_\delta = X_L - X_2 \text{ if } X_2 < X_{dw}^{f-1}$$

where a lateral coordinate of the lower straight line of the median strip in the current frame is corrected by applying $X_\delta$, calculated using Equations 15, to Equations 13 and 14, and when $X^{f-1}_{dw}$ is not smaller than $X_2$, coordinates of the lower straight line of the median strip are maintained and the lower straight line of the median strip is estimated.

13. The method of claim 1, wherein the predicted collision position is determined as an intersection point between the lower straight line of the median strip and a predicted path straight line of the moving vehicle; and wherein the predicted collision time is defined using Equation 16 below:

$$TTC = d_i / V_{SV} \qquad \text{[Equation 16]}$$

where TTC is the predicted collision time, $d_i$ is a predicted collision distance, and $V_{SV}$ is speed of the moving vehicle.

14. The method of claim 13, wherein the predicted path straight line is a straight line passing through short-distance world coordinates having a coordinate X corresponding to ½ of an area of the moving vehicle and a coordinate Y corresponding to a forward distance of 0 m and a long-distance world coordinate of a coordinate X corresponding to ½ of an area of the moving vehicle and a coordinate Y corresponding to a forward distance of 1000 m.

15. The method of claim 1, further comprising:
providing a warning information about the median strip at the predicted collision position and the predicted collision time.

16. The method of claim 15, wherein the warning information about the median strip is provided in a form of an image and sound from a navigation device, vibration of a steering device, or sound of a speaker of a vehicle; or wherein the vehicle is maintained in a lane by autonomously adjusting the steering device in conjunction with a lane-keeping assistance system based on the warning information about the median strip.

* * * * *